Jan. 12, 1932.  D. S. BAKER  1,841,237
APPARATUS FOR HANDLING MATERIALS
Filed June 10, 1929   3 Sheets-Sheet 2
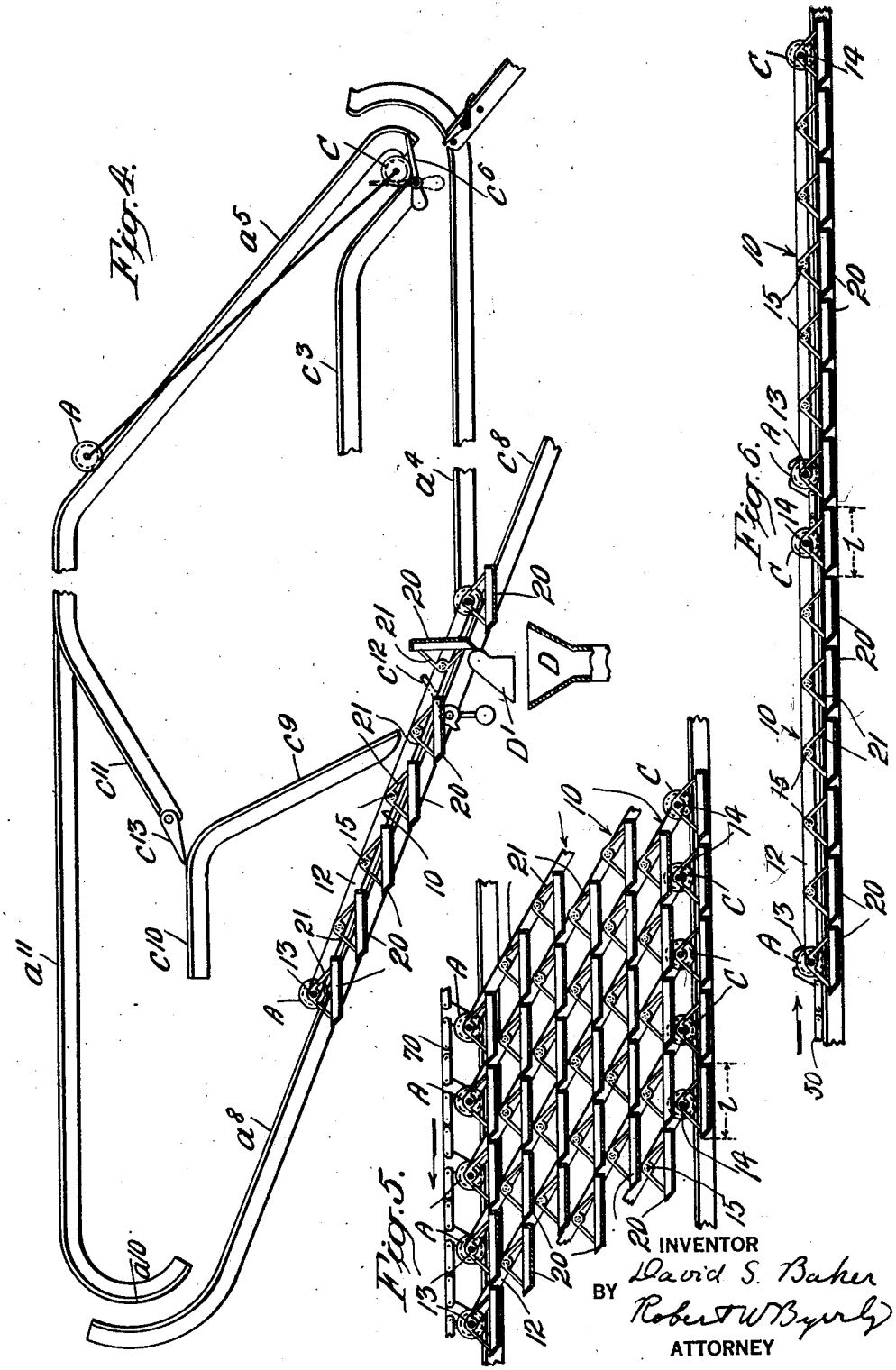
INVENTOR
David S. Baker
BY Robert W Byerly
ATTORNEY

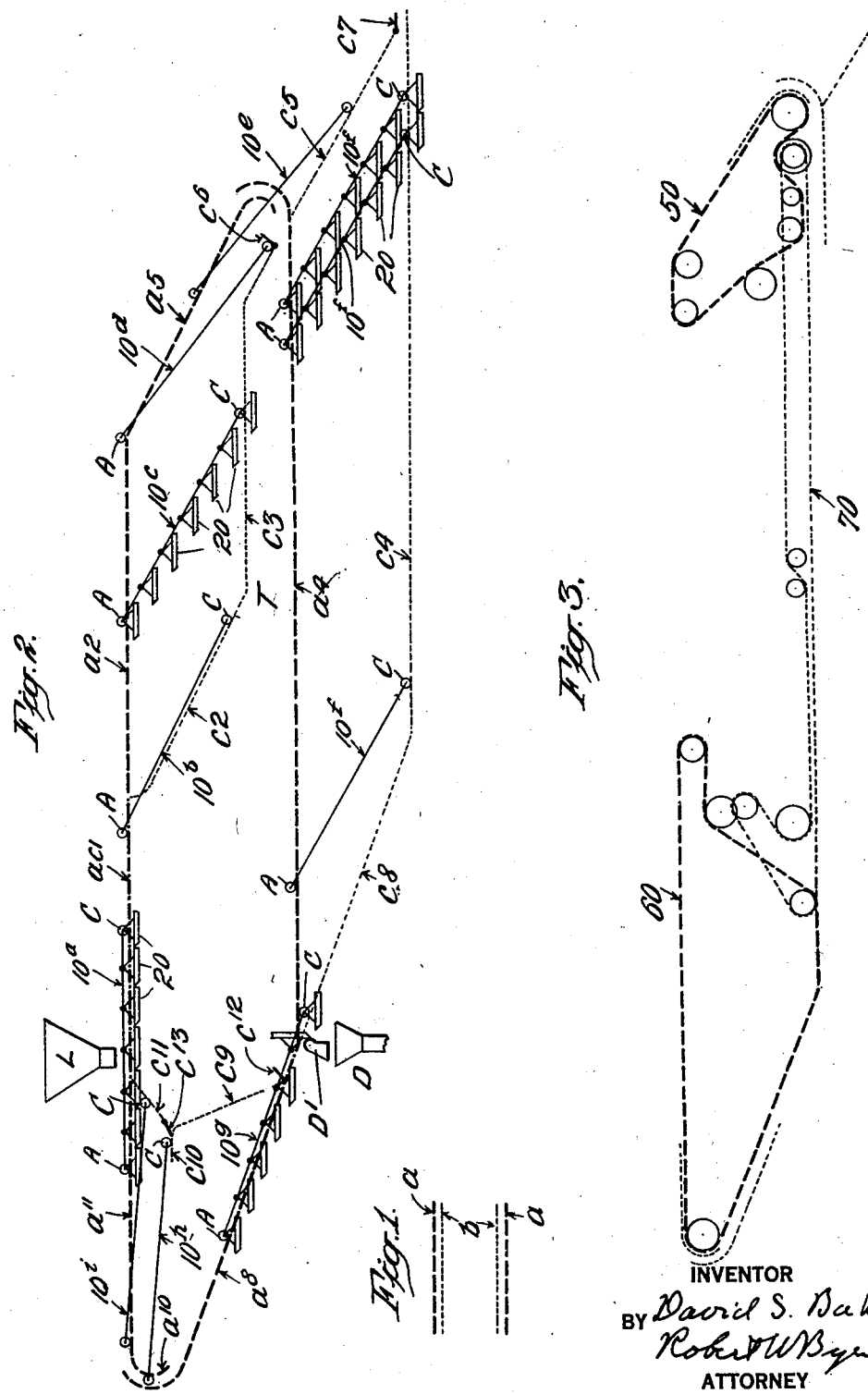

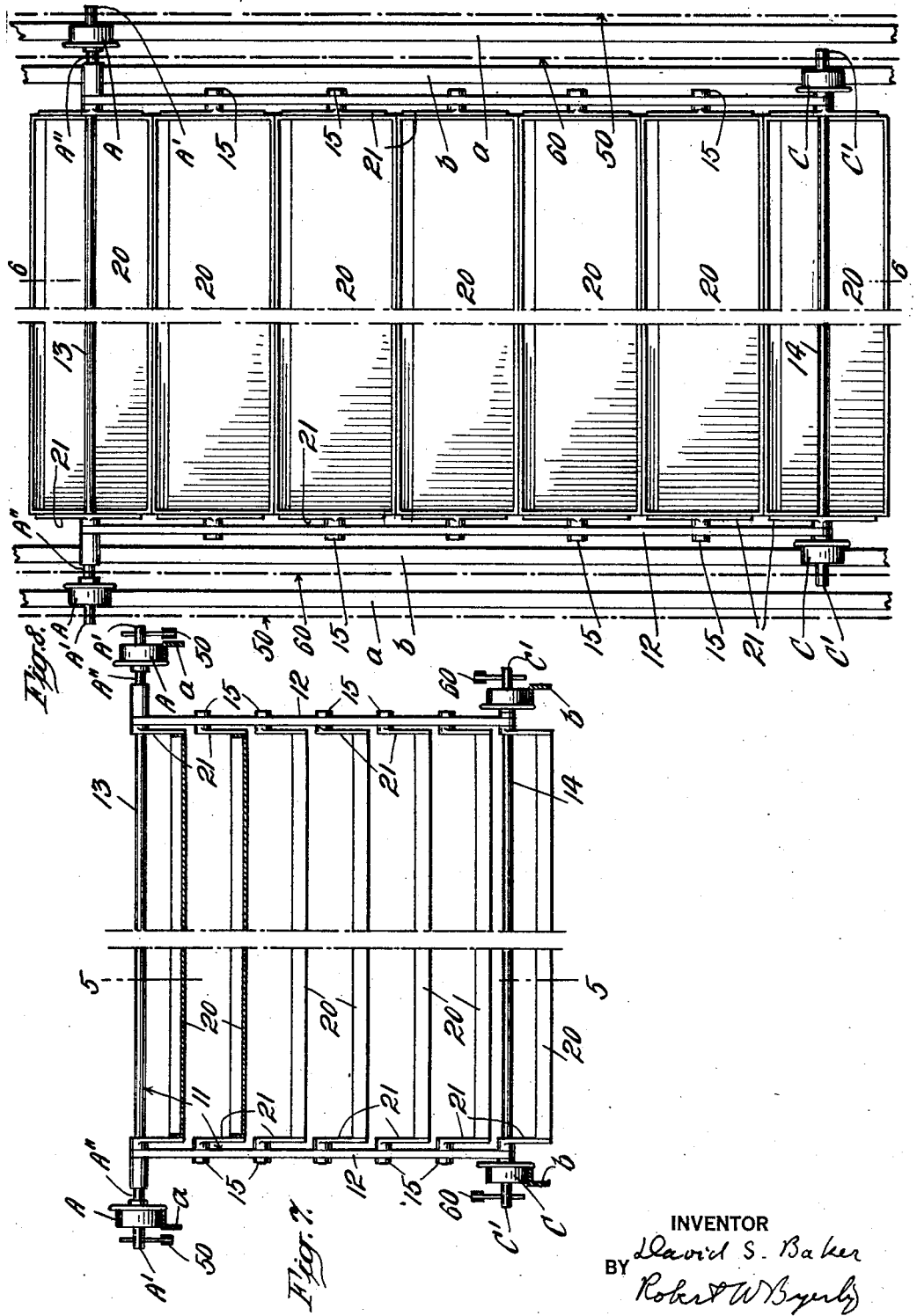

Patented Jan. 12, 1932

1,841,237

UNITED STATES PATENT OFFICE

DAVID S. BAKER, OF GREENWICH, CONNECTICUT

APPARATUS FOR HANDLING MATERIALS

Application filed June 10, 1929. Serial No. 369,611.

This invention relates to apparatus for handling materials, and aims to facilitate the movement, and more particularly the treatment of materials.

The invention relates to apparatus of the type described and claimed in my Patent No. 1,672,404 which included a number of separate carriers each having carrying elements adapted to be placed either in edge-to-edge or in superimposed relation, and means for controlling the movement of such carriers so as to place their carrying elements in edge-to-edge relation at a loading station and in superimposed relation in a treatment space.

The present invention aims to improve and simplify such apparatus. This object is attained in accordance with the present invention by providing a simplified carrier and a corresponding simplification in the means for controlling and moving the carriers.

Each carrier shown in said patent was provided with two connecting members and a plurality of carrying elements or trays hinged together in parallelogram arrangement. A carrier constructed in accordance with my present invention has but a single connecting member. A plurality of carrying elements are hinged to this connecting member in such manner that they are maintained horizontal, and consequently parallel, by gravity. The carrying elements are so positioned and proportioned that they lie edge-to-edge in a common horizontal plane when the connecting member of the carrier is horizontal, and lie in superimposed relation in parallel horizontal planes when the connecting member of the carrier is at an angle to the horizontal. A complete apparatus embodying the present invention includes means for moving such carriers and controlling the movement thereof, so as to place their carrying elements in a common horizontal plane at a loading station and in superimposed horizontal planes in a treatment space, and further provides means for tipping the carrying elements out of their normal horizontal position at a dumping station.

A practical apparatus embodying the invention is illustrated in the accompanying drawings, in which:

Fig. 1 is a diagrammatic plan view of a fragment of the track circuit for the carriers;

Fig. 2 is a diagrammatic side elevation of the entire track circuit indicating different positions taken by the carrier in passing around the circuit;

Fig. 3 is a diagrammatic side elevation of a system of chain conveyors which may be utilized to move the carriers around the track circuit shown in Fig. 2;

Fig. 4 is a side elevation of parts of the rails of the track circuit shown in Fig. 2, looking outwardly from the middle of the apparatus, and showing a carrier at the dumping station;

Fig. 5 is a vertical section of the upper portions of a plurality of carriers in treatment position, taken on the line 5—5 of Fig. 7;

Fig. 6 is a vertical section of carriers in loading position, taken on the line 6—6 of Fig. 8;

Fig. 7 is an end elevation of one of the carriers in treatment position; and

Fig. 8 is a plan view of one of the carriers in loading position.

The complete apparatus illustrated includes a large number of carriers 10, each provided with a plurality of carrying elements such as trays 20, and means for moving these carriers in a closed circuit which takes each tray past a loading station L, through a treatment space T, to a dumping station D, and back to the loading station L.

Each carrier 10 of the apparatus illustrated consists of a connecting member 11 and a plurality of carrying elements 20 pivotably suspended therefrom. The connecting member 11 includes two side-bars 12, secured together at their ends by cross-rods 13 and 14. Each of the carrying elements 20 consists of a tray whose ends are secured to hangers 21. The hangers 21 are secured to the connecting member 11 by pivots whose axes are separated by distances equal to the length $l$ of each tray 20. For convenience, the upper and lower hangers are pivoted on the cross-rods 13 and 14, and individual pivots 15 are provided for securing the intermediate hangers to the side-bars 12 of the connecting member.

The connecting member 11 of each carrier is provided with two pairs of wheels A and C. These pairs of wheels are spaced from one another, and may conveniently be placed at the opposite ends of the connecting member, coaxial with the cross-rods 13 and 14 which may be used as dead axles for the wheels. The wheels A are of a wider gauge than the wheels C.

To provide for engagement of the carriers by the flights of chain conveyors, the wheels A have projecting axles A' extending over the chains of a wide-gauge conveyor 50, indicated by dot and dash lines in Fig. 8 and hereinafter described; and the wheels C have projecting axles C' extending over the chains of a narrow-gauge conveyor 60, indicated by dot and dash lines in Fig. 8 and hereinafter described. The flights of the narrow-gauge conveyor may also engage exposed portions A'' of the axle of the wheels A inside the wheels.

From the above description of the carrier, it is apparent that all its trays 20 are normally horizontal, while the trays may be placed edge-to-edge in a common horizontal plane by placing the connecting member 11 horizontal as shown in Figs. 6 and 8, and may be placed in superimposed horizontal planes by placing the connecting member 11 at an angle to the horizontal as shown in Fig. 5. The relative position of the wheels A and C, therefore, controls the relation of the carrying elements. It is, however, not possible to place the trays in a dumping position by control of the wheels of the carrier, as in the case of the carrier described in my aforesaid patent.

A complete handling apparatus in accordance with the present invention includes a plurality of the carriers 10, closed track circuits for the wheels of the carriers so related to each other as to place the trays of each carrier in a common vertical plane at a loading station and in superimposed horizontal planes in a treatment space, and, in addition, means for tipping up the trays of each carrier at a dumping station. The track circuit may extend in a horizontal plane like that shown in my aforesaid patent, but more desirably lies in a vertical plane like that shown in my application filed May 8, 1929, Serial No. 361,383. To adapt the track circuit shown in that application to the carrier which has been described, a simplification may be effected by omitting altogether the track designated $b$ in that application. This results in the simplified track circuit shown in Figs. 1, 2 and 4, which includes a wide-gauge track $a$ for the wheels A and a narrow-gauge track $c$ for the wheels C. In Figs. 1 and 2, the track $a$ is indicated by a dash line, the track $c$, by a dot line, and a dot and dash line is used in the elevation to indicate the portions of the tracks $a$ and $c$ which are coplanar.

From Fig. 2, it will be seen that at the loading station L, the two tracks are horizontal and in the same plane, being represented by the line $ac1$. Beyond the loading station, the track $a$ has a horizontal portion $a2$, while the track $c$ has a downwardly inclined portion $c2$ at the entrance to the treatment space T and a horizontal portion $c3$ below the level of the portion $a2$ of the track $a$ and separated from this portion of the track $a$ by a vertical distance less than the length of the connecting members 11 of the carriers. In the lower part of the treatment space, the tracks $a$ and $c$ have horizontal portions $a4$, $c4$, separated by this same vertical distance. The right-hand ends of the upper and lower horizontal portions $a2$, $a4$ of the track $a$ are connected by an inclined and curved portion $a5$. The upper and lower horizontal portions $c3$, $c4$ of the track $c$ are connected by an inclined portion $c5$ which contains a switch $c6$ at the point at which it crosses the track $a$ and a switch $c7$ at the point at which it joins the horizontal portion $c4$.

At the dumping station D, the track $a$ has an upwardly inclined portion $a8$, followed by a curved portion $a10$, and a horizontal portion $a11$ joining the horizontal portion represented by the line $ac1$ at the loading station. On approaching the dumping station, the track $c$ has an upwardly inclined portion $c8$, which lies in the same inclined plane as the portion $a8$ of the track $a$, and overlaps the lower portion of the incline $a8$ at the dumping station. The track $c$ then has a more steeply inclined portion $c9$ curving into a horizontal portion $c10$, and an oppositely inclined portion $c11$ bringing it up to join the portion of the track $c$ at the loading station which is on a level with the track $a$ and is represented by the line $ac1$. The track $c$ is provided with a switch $c12$ at the point at which it extends upwardly away from the plane of the portion $a8$ of the track $a$, and with a switch $c13$ where its incline $c11$ joins its horizontal portion $c10$.

At the dumping station D, an abutment D1 is provided successively to engage and tip each individual carrying element of each carrier as it passes the dumping station.

The positions which each carrier assumes in traveling around the circuit are indicated diagrammatically in Fig. 2 at $10a$, $10b$, etc. In the loading position indicated at $10a$, the two pairs of wheels of the carrier are supported on the same level, so that the trays of the carriers are in edge-to-edge relation in a common plane. As the carrier proceeds to the right and enters the treatment space, its wheels C run down the incline $c2$ as shown at $10b$, so that, when the carrier has entered the treatment space as shown at $10c$, its connecting member is inclined and its trays in stepped relation.

When the carrier reaches the right-hand end of the treatment space, its wheels A descend along the incline a5, and its wheels C along the incline c5, as shown at 10d and 10e, without material change in the relation of its trays. During the descent of the carrier, the switch c6 is automatically closed by the wheels C as they cross it and automatically re-opened to permit the axle of the wheels A to pass through it, and the switch c7 is closed by the wheels C and automatically re-opened.

After the carrier has passed to the left through the lower part of the treatment space with its trays in stepped relation as shown at 10f, its wheels A mount the incline a8, while its wheels C mount the coplanar incline c8 as shown at 10g, so that the connecting member 11 of the carrier moves directly endwise and its trays move in a common inclined path. In this movement, the front edges of its trays are brought successively into contact with the abutment D1 which tips up the trays successively to dump the material from them, as clearly shown in Fig. 4.

Just as the after tray of the carrier is dumped, its wheels C close and cross the switch c12 and mount the incline c9. As the wheels A continue up the incline a8 and around the curve a10, the wheels C are drawn up the steep incline c9, under and then over the switch c13, and are then pushed up the incline c11 so that both pairs of wheels are brought back to a common level at the loading station L.

Automatic movement of the carriers 10 along the tracks may be secured by interconnected conveyors operating in timed relation. The track arrangement which has been described permits the use of a very simple conveyor arrangement, which is shown diagrammatically in Fig. 3. Only three conveyors are used, of which two, 50 and 60, operate at a relatively high speed for transferring the carriers between the upper and lower levels, while the third, 70, operates at a relatively low speed to move the carriers in both directions along the horizontal parts of the circuit. Each conveyor may consist of two chains having reaches lying close to a portion of one of the tracks, and provided with flights for engaging a part of the carriers 10. The chains of the conveyor 70 are positioned, as indicated by dot and dash lines in Fig. 7, so that their flights may engage the projecting axles C' of the wheels C and the axles A'' of the wheels A inside the wheels. The chains of the conveyor 60 are positioned, as indicated by dot and dash lines in Fig. 7, so that their flights may engage the projecting axles A' of the wheels A. The chains of the conveyor 50 are of the same separation as those of the conveyor 60.

From the partial indication of the tracks in Fig. 3, the relation between the conveyors shown in Fig. 3 and the track circuit shown in Fig. 2 is apparent: To enable the conveyor 50 to transfer the carriers from the upper tracks to the lower tracks at the right-hand end of the treatment space, the chains of this conveyor follow the course of the track a at the right-hand end of its horizontal portion a2, and along its inclined and curved portion a5. To enable the conveyor 60 to transfer the carriers from the lower tracks to the upper tracks at the left-hand end of the apparatus and to move them past the loading station, the chains of this conveyor follow the course of the track a the left-hand end of its horizontal portion a4, at its inclined portion a8, at its curved portion a10, at its horizontal portion a11, ac1, and at the left-hand part of its horizontal portion a2. To enable the conveyor 70 to move the carriers to the right in the upper part of the treatment space and to the left in the lower part, its chains have upper reaches following the course of the horizontal portion c3 of the track c and lower reaches following the course of the horizontal portion a4 of the track a.

The speed of the conveyors is so related that the trays of the carriers are moved past the loading station closely spaced in single file as shown in Fig. 6, and through the treatment space closely spaced in multiple file as shown in Fig. 5, so that they form a single traveling platform to receive material at the loading station, and a plurality of superimposed slowly traveling platforms in the treatment space. The fact that the connecting members 11 of the carriers have the form of open frames permits such close spacing of the trays in treatment position, even when the connecting members are considerably inclined as shown in Fig. 5, since the trays of one carrier may swing within the connecting member of the next carrier. The fact that the connecting members 11 are rigid makes it possible to support them by two wheels in this inclined position, as well as in their horizontal position at the loading station. It is to be noted, however, that, for this purpose, it is not necessary that the connecting members be rigid in all directions, but merely that they be incapable of bending in one direction, that is, toward their sides which are lowest in the horizontal loading position and in the inclined treatment position illustrated.

To provide automatically for such close spacing of the trays of the carriers, both in loading position and in treatment position, the speed of the conveyor 60, which moves the carriers past the loading station, is substantially equal to the speed of the conveyor 70 multiplied by the number of trays in each carrier. The speed of the conveyor 50 is preferably somewhat greater than that of the conveyor 60. In order that each carrier may be positively guided and timed throughout its circuit, the flights of the different conveyors are spaced apart by distances proportional to the speed of the conveyors. Various forms of known mechanism may be used to operate the conveyors at the relative speeds specified. A mechanism suitable for this purpose is illustrated and described in my co-pending application, Serial No. 361,383, filed May 8, 1929.

Any desired or convenient form of mechanism may be provided for discharging the material to be treated upon the trays of the carriers at the loading station L. At the dumping station D, the material may be received in a narrow chute owing to the fact that each individual tray of each carrier is dumped at the same point of the circuit.

What I claim is:

1. An independent carrying unit, comprising more than two carrying elements, and a rigid connecting member to which said carrying elements are hinged on lines located directly over the centers of gravity of the carrying elements and separated by distances equal to the lengths of the carrying elements.

2. An independent carrying unit, comprising more than two carrying elements, and a connecting member inflexible at least in one direction to which said carrying elements are hinged on lines located directly over the centers of gravity of the carrying elements and separated by distances equal to the lengths of the carrying elements.

3. An independent carrying unit, comprising a rigid connecting member and a plurality of trays hinged to said connecting member on lines directly over the centers of gravity of the trays and separated by a distance equal to the length of the trays, and a wheel secured to the upper end of the connecting member.

4. An independent carrying unit, comprising a connecting member inflexible in at least one direction, pairs of wheels of different gauges at the ends of the connecting member, and a plurality of carrying elements pivotably suspended from the connecting member.

5. A carrier, comprising a connecting member inflexible in at least one direction, a plurality of parallel pivots on said connecting member, hangers depending from said pivots, and carrying elements mounted in said hangers and each having a length equal to the distance between successive pivots.

6. A carrier, comprising a connecting member inflexible in at least one direction, a plurality of parallel pivots on said connecting member, triangular hangers depending from said pivots, and horizontal trays mounted in said hangers and each having a length equal to the distance between successive pivots.

7. A carrier, comprising a connecting member having the form of an open frame inflexible in at least one direction, a plurality of carrying elements pivotally suspended from said connecting member and adapted to swing within the connecting member of an adjacent carrier.

8. A carrier, comprising a connecting member consisting of two rigid side-bars and tie-rods connecting said side-bars, a plurality of pairs of hangers pivoted to said side-bars on equally spaced axial lines perpendicular to the side-bars, and a carrying element secured to each pair of hangers and having a length equal to the distance between said axial lines.

9. In apparatus for handling materials, the combination with a carrier comprising a connecting member and a plurality of carrying elements suspended therefrom, of means for moving said carrier past a loading station, through a treatment space and past a dumping station, means operative on such movement of the carrier to place the ends of its connecting member in the same horizontal plane at the loading station and in different horizontal planes in the treatment space, and means adapted to engage and tip the carrying elements of the carrier at the dumping station.

10. In apparatus for handling materials, the combination with a carrier having a connecting member and a plurality of carrying elements suspended therefrom, of means for guiding one end of the connecting member past a loading station in a horizontal path, through a treatment space in a horizontal path, and past a dumping station, means for guiding the other end of the connecting member in a path on a line with said first path at the loading station, in a path spaced from said first path in the treatment space, and in a path on a line with said first path at the dumping station, and means for successively engaging and tipping the individual carrying elements of the carrier at the dumping station.

11. The combination with a carrier having a connecting member and a plurality of carrying elements suspended therefrom, of means for guiding one end of the connecting member past a loading station in a horizontal path, through a treatment space in a horizontal path, and past a dumping station in an inclined path, means for guiding the other end of the connecting member in a path on a line with said first path at the loading station, in a path spaced from said first path in the treatment space, and in a path on a line with said first path at the dumping station, and an abutment at the dumping station positioned to engage and tip the individual carrying elements of the carrier successively.

12. The combination with a carrier having a connecting member and a plurality of carrying elements suspended therefrom, of means for guiding one end of the connecting member past a loading station in a horizontal path, through a treatment space in a horizontal path, and past a dumping station, means for guiding the other end of the connecting member in a path on a line with said first path at the loading station, in a path spaced from said first path in the treatment space, and past the dumping station, and means at the dumping station for engaging and tipping the carrying elements of the carrier.

13. In apparatus for handling materials, the combination with a plurality of carriers each having a connecting member and a plurality of carrying elements suspended therefrom, of means for guiding one end of the connecting member of each carrier in a closed path having a horizontal portion at a loading station, a horizontal portion in a treatment space, and a portion at a dumping station, means for guiding the other end of the connecting member of each carrier in a closed path which is on a line with the first path at the loading station and spaced therefrom in a treatment space, means for moving the carriers at a relatively rapid rate past the loading and dumping stations and at a relatively slow rate through the treatment space, and means for tipping the carrying elements of each carrier at the dumping station.

14. In apparatus for handling materials, the combination with a plurality of carriers each having a connecting member and a plurality of carrying elements suspended therefrom, of means for guiding one end of the connecting member of each carrier in a closed path having a horizontal portion at a loading station, a horizontal portion in a treatment space, and a portion at a dumping station, means for guiding the other end of the connecting member of each carrier in a closed path which is on a line with the first path at the loading station and at the dumping station and spaced therefrom in the treatment space, means for moving the carriers at a relatively rapid rate, past the loading and dumping stations and at a relatively slow rate through the treatment space, and an abutment at the dumping station positioned to successively engage and tip the indvidual carrying elements of the successive carriers.

15. A movable independent carrying unit, comprising more than two carrying elements and a rigid connecting member to which said carrying elements are hinged on lines located directly over the centers of gravity of the carrying elements and separated by distances equal to the lengths of the carrying elements, and guiding means engaging the connecting member at two spaced points and adapted to position the carrying unit first with its connecting member horizontal and its carrying elements in edge-to-edge relation and then with its connecting member at an angle to the horizontal and its carrying elements in superimposed relation.

16. A movable independent carrying unit, comprising more than two carrying elements and a connecting member inflexible at least in one direction to which said carrying elements are hinged on lines located directly over the centers of gravity of the carrying elements and separated by distances equal to the lengths of the carrying elements, and guiding means engaging the connecting member at two spaced points and adapted to position the carrying unit first with its connecting member horizontal and its carrying elements in edge-to-edge relation and then with its connecting member at an angle to the horizontal and its carrying elements in superimposed relation.

17. A movable independent carrying unit, comprising a rigid connecting member and a plurality of trays hinged to said connecting member on lines directly over the centers of gravity of the trays and separated by a distance equal to the length of the trays, a wheel secured to the upper end of the connecting member, a horizontal track for said wheel, and guiding means engaging a point of said connecting member spaced from said wheel and positioned in part on a level with said track and in part below said track.

18. An independent carrying unit, comprising a connecting member inflexible in at least one direction, pairs of wheels of different gauges at the ends of the connecting member, a plurality of carrying elements pivotably suspended from the connecting member, a track for one of said pairs of wheels at least portions of which are horizontal, and a track for the other pair of wheels having a horizontal portion on a level with a horizontal portion of the first track and a horizontal portion spaced vertically from a horizontal portion of the first track.

19. A carrier, comprising a connecting member inflexible in at least one direction, a plurality of parallel pivots on said connecting member, hangers depending from said pivots, carrying elements mounted in said hangers and each having a length equal to the distance between successive pivots, means for guiding one end of the connecting member in a path having horizontal portions, and means for guiding the other end of the connecting member in a path having a horizontal portion in line with the horizontal portion of the first path to place the connecting member of the carrier in a horizontal position and having a horizontal portion vertically spaced from a horizontal portion of the first path to place the connecting member of the carrier in a position inclined to the horizontal.

20. A carrier, comprising a connecting member inflexible in at least one direction, a plurality of parallel pivots on said connecting member, triangular hangers depending from said pivots, horizontal trays mounted in said hangers and each having a length equal to the distance between successive pivots, means for guiding one end of the connecting member in a path having horizontal portions, and means for guiding the other end of the connecting member in a path having a horizontal portion in line with the horizontal portion of the first path to place the connecting member of the carrier in a horizontal position and having a horizontal portion vertically spaced from a horizontal portion of the first path to place the connecting member of the carrier in a position inclined to the horizontal.

21. In apparatus for handling materials, the combination of a plurality of carriers each comprising a connecting member having the form of an open frame and a plurality of carrying elements pivotably suspended from said connecting member, and guiding means for said carriers adapted to position at least one carrier with its connecting member horizontal and to position a plurality of the carriers with their connecting members closely spaced in parallel planes inclined to the horizontal so that the carrying elements of each of said carriers swing within the connecting member of the adjacent carrier.

22. In apparatus for handling materials, the combination of a plurality of carriers each comprising a connecting member consisting of two rigid side-bars and tie-rods connecting said side-bars, a plurality of pairs of hangers pivoted to said side-bars on equally spaced axial lines perpendicular to the side-bars, a carrying element secured to each pair of hangers and having a length equal to the distance between said axial lines, and guiding means for said carriers adapted to position at least one of the carriers with its connecting member horizontal and its carrying elements in edge-to-edge relation and to position a plurality of the carriers with their connecting members in parallel planes inclined to the horizontal so that the trays of each of said carriers are in superimposed relation and adjacent to the trays of the next carrier.

23. In apparatus for handling materials, the combination of a plurality of carriers each comprising a connecting member and a plurality of movable carrying elements suspended therefrom, and guiding means for said carriers adapted to position at least one of the carriers with its connecting member horizontal and its carrying elements in edge-to-edge relation in a horizontal plane and to position a plurality of the carriers with their carrying elements in closely spaced parallel planes inclined to the horizontal.

24. In apparatus for handling materials, the combination with a carrier having a connecting member and a plurality of carrying elements suspended therefrom, of means for guiding one end of the connecting member in a path at least portions of which are horizontal, and means for guiding the other end of the connecting member in a path having a horizontal portion in line with a horizontal portion of the first path and another horizontal portion vertically spaced from a horizontal portion of the first path.

In testimony whereof I have hereunto set my hand.

DAVID S. BAKER.